United States Patent
Bullard

(10) Patent No.: US 11,890,677 B2
(45) Date of Patent: Feb. 6, 2024

(54) FRACTURABLE SUPPORT STRUCTURE AND METHOD OF FORMING THE STRUCTURE

(71) Applicant: XEROX CORPORATION, Norwalk, CT (US)

(72) Inventor: Daniel Bullard, Palo Alto, CA (US)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 17/560,948

(22) Filed: Dec. 23, 2021

(65) Prior Publication Data
US 2023/0201928 A1 Jun. 29, 2023

(51) Int. Cl.
| | |
|---|---|
| B22F 10/50 | (2021.01) |
| B33Y 10/00 | (2015.01) |
| B33Y 80/00 | (2015.01) |
| B33Y 40/20 | (2020.01) |
| B22F 10/66 | (2021.01) |
| B22F 10/22 | (2021.01) |

(Continued)

(52) U.S. Cl.
CPC .......... B22F 10/50 (2021.01); B22D 23/003 (2013.01); B22F 10/22 (2021.01); B22F 10/66 (2021.01); B33Y 10/00 (2014.12); B33Y 40/20 (2020.01); B33Y 80/00 (2014.12); C23C 8/24 (2013.01)

(58) Field of Classification Search
CPC .......... B22F 10/40; B22F 10/43; B22F 10/47; B22F 10/50; B33Y 10/00; B33Y 40/00; B33Y 40/10; B33Y 40/20; B33Y 70/00; B33Y 70/10; B33Y 80/00
See application file for complete search history.

(56) References Cited

U.S. PATENT DOCUMENTS

| | | |
|---|---|---|
| 6,790,403 B1 | 9/2004 | Priedeman, Jr. et al. |
| 9,815,118 B1 | 11/2017 | Schmitt et al. |

(Continued)

FOREIGN PATENT DOCUMENTS

| | | |
|---|---|---|
| WO | 9711837 A1 | 4/1997 |
| WO | WO-2021232298 A1 * | 11/2021 |

OTHER PUBLICATIONS

Extended European Search Report for European Application No. 22211712.9, dated Mar. 27, 2023 (10 pages).

(Continued)

*Primary Examiner* — Alexandra M Moore
(74) *Attorney, Agent, or Firm* — MH2 Technology Law Group LLP

(57) ABSTRACT

An embodiment of the present disclosure is directed to a method of additive manufacturing. The method comprises: i) forming a first layer, the first layer comprising at least one material chosen from an article material, a support structure material and a fracturable material; ii) forming an additional layer on the first layer, the additional layer comprising at least one material chosen from the article material, the support structure material and the fracturable material; and iii) repeating ii) one or more times to form a three-dimensional build comprising an article and at least one support structure attached to the article at an interface, the interface comprising the fracturable material formed during one or more of i), ii) or iii), the fracturable material being formed by exposing a print material with a gas reactant. A three-dimensional build is also disclosed.

12 Claims, 3 Drawing Sheets

(51) Int. Cl.
 B22D 23/00 (2006.01)
 C23C 8/24 (2006.01)

(56) References Cited

U.S. PATENT DOCUMENTS

| | | | |
|---|---|---|---|
| 9,833,839 | B2 | 12/2017 | Gibson et al. |
| 2004/0187714 | A1 | 9/2004 | Napadensky et al. |
| 2017/0022111 | A1* | 1/2017 | Jarvis ........................ A61F 2/28 |
| 2017/0087632 | A1 | 3/2017 | Mark |
| 2017/0297111 | A1 | 10/2017 | Myerberg et al. |
| 2018/0154580 | A1 | 6/2018 | Mark |
| 2018/0162062 | A1 | 6/2018 | Mark |
| 2018/0304361 | A1 | 10/2018 | Gibson et al. |
| 2019/0193335 | A1 | 6/2019 | Giller et al. |
| 2020/0009795 | A1 | 1/2020 | Gibson et al. |
| 2020/0171739 | A1 | 6/2020 | Dikovsky et al. |
| 2021/0001401 | A1* | 1/2021 | Shaarawi .............. C09D 11/033 |
| 2021/0252589 | A1* | 8/2021 | Himmel .................. B22F 10/22 |
| 2021/0331381 | A1 | 10/2021 | Van Brocklin et al. |
| 2022/0402060 | A1* | 12/2022 | Liu ........................ B22F 12/53 |

OTHER PUBLICATIONS

Wei et al., "A Fracturable Support Structure and Method of Forming the Structure," U.S. Appl. No. 17/859,782, filed Jul. 7, 2022.
Iftime et al., A Fracturable Support Structure and Method of Forming the Structure, U.S. Appl. No. 17/859,804, filed Jul. 7, 2022.
Mika, Mariusz Tadeusz et al., Modification of Metal Jetting Compositions and Methods Thereof, U.S. Appl. No. 17/462,804, filed Aug. 31, 2021.
Mika, Mariusz Tadeusz et al., Ejector for Modification of Metal Jetting Compositions and Methods Thereof, U.S. Appl. No. 17/462,713, filed Aug. 31, 2021.

* cited by examiner

FRACTURABLE SUPPORT STRUCTURE AND METHOD OF FORMING THE STRUCTURE

DETAILED DESCRIPTION

Field of the Disclosure

The present disclosure is directed to a three-dimensional build that includes a support structure attached to an article at a fracturable interface, and a method of additive manufacturing for making the three-dimensional build.

Background

Because additive manufacturing is carried out one layer at a time, support structures are often employed to support the structure during the printing process. These support structures can take the form of, for example, a plurality of pillars that support an overhang structure of a part being printed. The support structures serve multiple functions. For example, they provide structural stability to the layers deposited as an article being printed (sometimes referred to as a "part") widens out from a narrower base region. The support provided by these structures allows more complex geometries to be printed and can allow for reduced weight of the final part. Additionally, support structures allow for improved thermal management during printing, especially when printing metals. These structures provide a path for thermal energy to move from the part to heat sinks, or from heat sources into the part. Support structures can be developed using the same material being used to make the part, or if the printer has the capability to print multiple materials, can be printed from a second material.

One problem with many support structures, especially with metal printing, is they are not easily removed from the part. A significant amount of time and/or money can be spent during "post processing" to fully remove the support structures and smooth or polish the remaining rough areas left on the part surface. Further, such support structures can result in degraded quality of the final printed part surface.

Improved support structures and methods of additive manufacturing that employ the support structures would be a desirable step forward in the art.

SUMMARY

An embodiment of the present disclosure is directed to a method of additive manufacturing. The method comprises: i) forming a first layer, the first layer comprising at least one material chosen from an article material, a support structure material and a fracturable material; ii) forming an additional layer on the first layer, the additional layer comprising at least one material chosen from the article material, the support structure material and the fracturable material; and iii) repeating ii) one or more times to form a three-dimensional build comprising an article and at least one support structure attached to the article at an interface, the interface comprising the fracturable material formed during one or more of i), ii) or iii), the fracturable material being formed by exposing a print material with a gas reactant.

Another embodiment of the present disclosure is directed to a method of additive manufacturing. The method comprises: i) jetting droplets comprising a metal to form a first layer, the first layer comprising at least one material chosen from an article material, a support structure material and a fracturable material; ii) jetting additional droplets comprising the metal to form an additional layer on the first layer, the additional layer comprising at least one material chosen from the article material, the support structure material and the fracturable material; and iii) repeating ii) one or more times to form a three-dimensional build comprising an article and at least one support structure attached to the article at an interface, the interface comprising the fracturable material formed during one or more of i), ii) or iii), the fracturable material being formed by exposing portions of metal in at least one form chosen from the droplets, the additional droplets, the first layer and the addition layer with a gas reactant.

Yet another embodiment of the present disclosure is directed to a three-dimensional build. The three-dimensional build comprises an article comprising a print material. At least one support structure is attached to the article at a fracturable interface. The fracturable interface comprises a native non-metal that is different from the print material.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
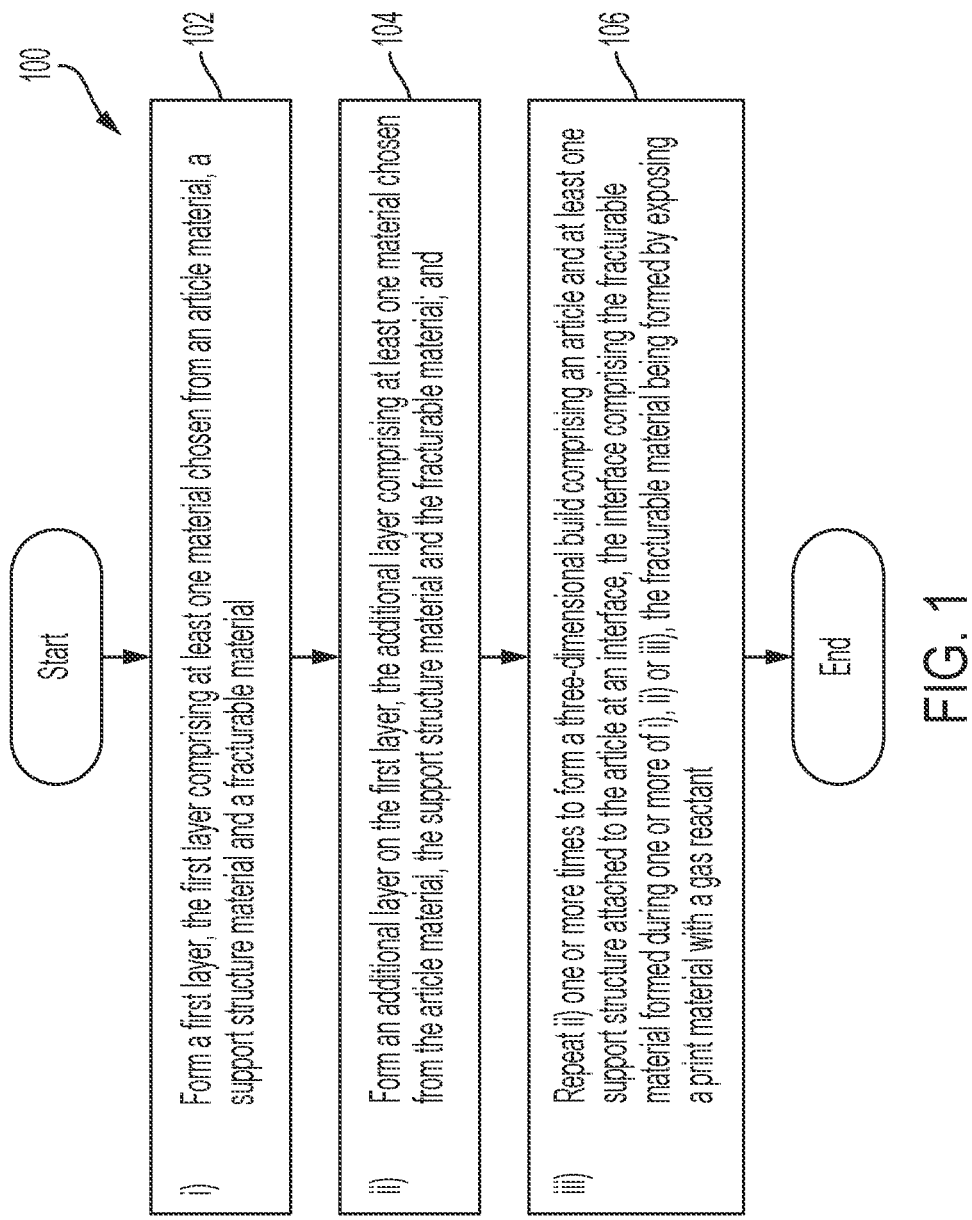
FIG. 1 is a flow chart of a method of additive manufacturing, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that forms a part thereof, and in which is shown by way of illustration a specific exemplary embodiments in which the present teachings may be practiced. The following description is, therefore, merely exemplary.

The present disclosure is directed to a method of making a three-dimensional build and the build products formed thereby. The three-dimensional build comprises an article comprising a print material. At least one support structure is attached to the article at a fracturable interface. The fracturable interface comprises a native non-metal (e.g., native oxide, native oxynitride or native nitride) that is different from the print material. A small amount of the native non-metal at the interface between the support structure and the 3D article can weaken the interface while still allowing for the desired support of the 3D article and/or the desired conduction of thermal energy away from the 3D article to, for example, heat sinks. The areas of no or weak bonding at the interface will create a fracture, or cleavage, zone that will allow the support structures to be easily removed after printing.

Figure 2A:
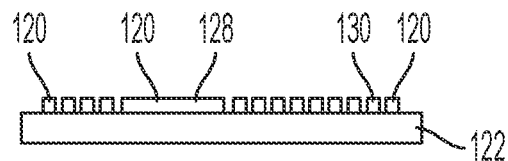
FIG. 2A illustrates a schematic side view of a first layer deposited on a build plate of a 3D printer, according to an embodiment of the present disclosure.

FIG. 1 is a flow chart of a method of additive manufacturing 100, according to an embodiment of the present disclosure. As shown at 102 of FIG. 1, the method comprising forming a first layer. The first layer comprises at least one material chosen from an article material, a support structure material and a fracturable material. FIG. 2A illustrates a schematic side view of an example of a first layer 120 deposited on a build plate 122 of a 3D printer (not shown). The term "on" as employed herein is defined broadly so as not to require direct physical contact and encompasses configurations of both direct physical contact and indirect physical contact. Thus, intervening layers can be positioned between the first layer and the build plate, or the first layer can be directly on the build plate, for example. Unless otherwise made clear by the disclosure, each occurrence of the term "on" herein provides support for the concept of direct physical contact.

As shown at 104 of FIG. 1, an additional layer is formed on the first layer. The additional layer can also comprise at least one material chosen from the article material, the support structure material and the fracturable material. The process of forming layers, as shown at 104, is repeated one or more times to form a three-dimensional build, as shown at 106.

Figure 2B:
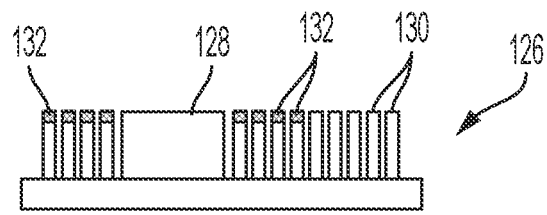
FIG. 2B illustrates an example of a partially finished three-dimensional build after a plurality of layers have been formed, according to an embodiment of the present disclosure.

Any of the layers deposited to form the three-dimensional build can comprise one or more types of material. FIG. 2B illustrates an example of a partially finished three-dimensional build 126 after a plurality of layers have been formed. The topmost portion of the partially finished three-dimensional build 126 is shown comprising article material 128, support structure material 130 and fracturable material 132. The layer in FIG. 2A, on the other hand, is only shown to comprise article material 128 and support structure material 130. Further, a single layer can comprise only article material, only support material, only fracturable material, or any combination of these materials. The article material can be the same or different than the support material. Advantages of both the article material and the support material being the same print material include a potential for improved thermal conduction characteristics of the structural supports because the article and supports have similar thermal conductivity and the ability to print the entire structure with fewer (e.g., a single) print nozzle.

Figure 2C:
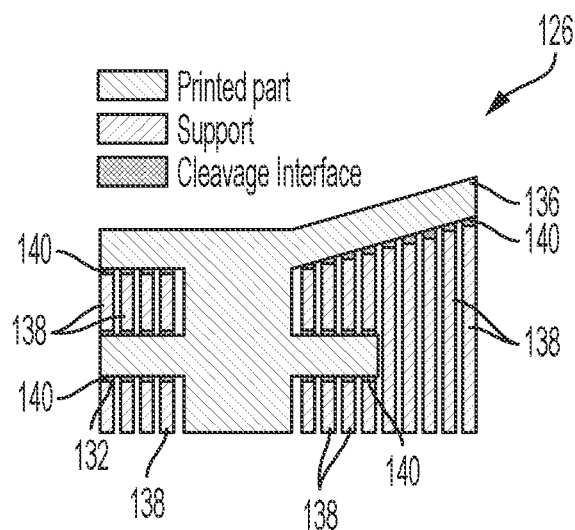
FIG. 2C illustrates an example of a completed three-dimensional build prior to post processing comprising an article and at least one support structure attached to the article at an interface, according to an embodiment of the present disclosure.

The finished three-dimensional build comprises an article and at least one support structure attached to the article at an interface. The interface can comprise the fracturable material that was formed during one or more of the layer forming processes of method 100. As will be described in greater detail below, the fracturable material is formed by exposing a print material, such as, for example, the the support structure material, with a gas reactant. FIG. 2C illustrates an example of a finished three-dimensional build 126 comprising an article 136 and at least one support structure 138 attached to the article at an interface 140.

The article 136 can comprise any suitable material that can be deposited by additive manufacturing. In an embodiment, the article material is a metal, such as aluminum, aluminum alloys (e.g., alloys 4008 and 6061 or any others), cupper, copper alloys, silver, silver alloys, iron or iron alloys, such as steel, or other metals.

The at least one support structure 138 can comprise any suitable material that can be deposited by additive manufacturing and that can provide the desired support. In an embodiment, the support structure material is a metal, such as aluminum, aluminum alloys (e.g., alloys 4008 and 6061 or any others), copper, copper alloys, silver, silver alloys, iron or iron alloys, such as steel, or other metals. The width and spacing of the support structures 138 can vary with both the material being printed and the geometry of the article 136. Examples of width dimensions for support structures 138 include diameters of about 0.5 mm to about 5 mm, such as about 1 mm to about 2 mm for a cylindrical pillar type structure. For support structures with non-circular cross-sections, these same width dimensions can be applied to the shortest width dimension that intersects the longitudinal axis of the support structure. Examples of spacing between the support structures 138 include distances of about 2 mm to about 20 mm, such as about 4 mm to about 8 mm. The longer the overhang (e.g., such as the overhangs shown in FIG. 2C), the closer the spacing can be between the support structures 138, in order to provide the desired support. In an example, a ratio of the total length of an overhang to the total width (e.g., diameter) of all of the support structures providing support to the overhang ranges from about 10:1 to about 2:1.

The at least one interface 140 can comprise any suitable fracturable material that: can be formed by reacting a gas with the print material that is used to form the support structure; and can provide the desired support while being readily fracturable. The fracturable material can have one or more, or all, of the following properties: a limited reactivity with the metal being printed; be printable; be thermally stable at build temperatures; a sufficient thermal conductivity so as not to excessively interfere with local microstructure development; and the ability to allow the desired metal or other print material to be deposited thereon (e.g., it is wettable by the printed metal).

The fracturable material can be a native non-metal. The term "native non-metal" as used herein means that the non-metal is formed by reacting a gas with a metal in solid or liquid form to form the non-metal. In an embodiment, the fracturable material is a native non-metal that is an oxide, nitride or oxynitride of any of the metals described herein for making the article or support structure. As an example, the print material for making both the article 136 and the support structure 138 is aluminum or aluminum alloy, and the fracturable material is an oxide of the aluminum or aluminum alloy.

Examples of reactant gases that can be employed to convert the metal to a fracturable non-metal during the additive manufacturing process include oxygen-containing gases, such as oxygen gas ($O_2$), oxygen plasma, ozone ($O_3$) and water gas ($H_2O$); and nitrogen-containing gases, such as ammonia ($NH_3$) or nitrogen gas ($N_2$).

While FIG. 2C shows that the fracturable interface 140 are disposed only at one or more terminus of the support structure attached to the article 136, other configurations for the interface 140 that allow for easy removal of the support structures can be employed. For example, any suitable amount of the support structure can comprise the fracturable material. In an embodiment, the entire support structure 138, or substantially the entire support structure 138, comprises a native non-metal fracturable material.

In an embodiment, the entire cross section of the interface 140 can comprise the fracturable material 132. In another embodiment, only a portion of the cross-section of interface 140 is reacted with the reactant gas to form the fracturable material 132. This can allow the thermal conductivity and/or electrical conductivity to be maintained while still lowering the strength of the interface to allow for ease of fracturing. Reacting only a portion of the interface to maintain conductivity may be desirable if the goal is to use the article 136 without carrying out post printing heat treatments.

In an embodiment, the article material, support structural material and fracturable material are formed by printing the layers using a print material that is a liquid metal. For example, forming the layers can comprise jetting the liquid metal in an ambient atmosphere onto a print substrate, such as the build plate 122. As will be described in more detail below, the ambient atmosphere can be modified to form a metal or a non-metal. When forming the fracturable material, for instance, the ambient atmosphere can comprise the reactant gas in sufficient amounts such as greater than 10%, such as about 15% to about 100%, or about 20% to about 90% by volume, to convert the metal print material to a non-metal. When forming the article 136 or metal portions of support structures 138, the ambient atmosphere does not comprise substantial amounts of the reactant gas, but instead employs an inert or substantially inert atmosphere, such as an inert gas or vacuum. For example, the amount of oxygen or other reactant gas can range from 0% to less than 10% by volume, such as less than 5% by volume, less than 1% by volume or less than 0.1% by volume, depending on the reactivity of the system being printed.

After the three-dimensional build 126 is printed, the method can further include cooling the article 136 and the support structures 138. If the additive manufacturing process employs liquid metal jetting, the entire process can be carried out without sintering the article 136. In other 3D printing processes, sintering can be carried out on the three-dimensional build, either before or after removal of the support structures 138.

The method can further comprise removing the support structures 138 by fracturing the fracturable material at, for example, the interface 140. The fracturing and removal of the support structures can occur without employing a mechanical cutting device, such as a saw, wire cutters or other such device. For example, the fracturing can be carried out using a technique chosen from vibrating the structural support, such as by employing an ultrasonic bath, or by contacting the structural support with a pressurized fluid, such as a water jet. The fracturable interface combined with such removal processes can allow for one or more of the following advantages: easy removal of the structural support, the removal of supports from internal structures that would be difficult or impossible to get to with a cutting tool, and/or improved surface quality of the final 3D article.

The methods of the present disclosure can be employed with any type of additive manufacturing process, such as extrusion techniques, jetting techniques, and so forth. In an embodiment, the process is carried out with liquid metal deposition printing, such as a metal jetting process. One known technique for jetting metals employs a magnetohydrodynamic (MHD) printer, which is suitable for jetting liquid metal layer upon layer to form a 3D metallic object.

Figure 3:
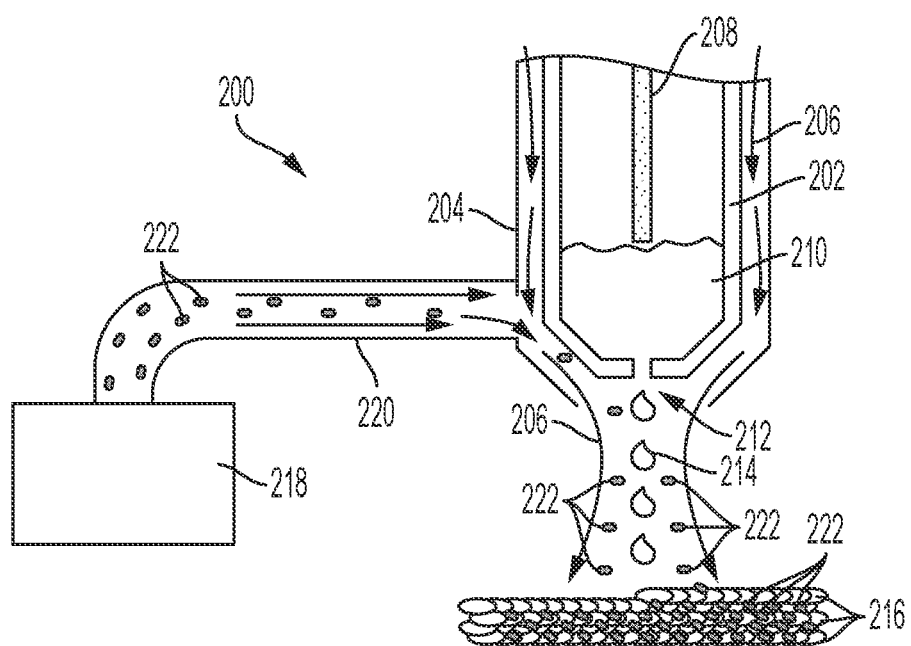
FIG. 3 is a schematic cross-sectional view of a single liquid ejector jet configured for jetting modified metal compositions, according to an embodiment of the present disclosure.

FIG. 3 is a schematic cross-sectional view of a single liquid ejector jet configured for jetting modified metal compositions, such as fracturable materials, in a metal jetting process, according to an embodiment of the present disclosure. A liquid ejector jet 200 is shown in FIG. 3, the liquid ejector jet 200 defining a nozzle 202 portion having a gas shield 204 surrounding the nozzle 202 portion. The gas shield 204 surrounds the nozzle 202 and contains a first gas 206, also referred to as a cover gas. The cover gas surrounds the nozzle 202 with the cover gas 206. This gas or air shield 204 provides an air shield around an external portion of the nozzle 202. The gas shield 204 surrounds the printing operation with an inert cover gas 206, which may be used to regulate temperature and atmosphere around the liquid ejector jet 200.

The 3D printer and accompanying liquid ejector jet 200 may also include one or more gas-controlling devices, which may be or include a source (not shown) of the cover gas 206. The gas source may be configured to introduce the cover gas 206. The cover gas 206 may be or include an inert gas, such as helium, neon, argon, krypton, and/or xenon. In another embodiment, the gas may be or include nitrogen. The gas may include less than about 10% by volume oxygen, less than about 5% oxygen, or less than about 1% by volume oxygen. In at least one embodiment, the gas can be introduced via a gas line which includes a gas regulator configured to regulate the flow or flow rate of one or more gases introduced into and/or around the liquid ejector jet 200 from the gas source. For example, the gas may be introduced at a location that is above the liquid ejector jet 200 and/or above a heating element for heating the gas (not shown). This may allow the gas (e.g., argon) to form a shroud/sheath that functions as an air shield around the liquid ejector jet 200, the drops 214, the 3D object, and/or the substrate to reduce/prevent the formation of oxide (e.g., metal oxide, such as aluminum oxide). In an embodiment, controlling the temperature of the gas can help to control (e.g., minimize) the rate that the oxide formation occurs. Reducing formation of oxide or other non-metals is generally desirable when forming an article and/or support structure that comprises metals that are easily oxidized at printing temperatures.

The liquid ejector jet 200 may define an inner volume, also referred to as an internal cavity, which retains a molten or liquid printing material 210 in the inner volume of the liquid ejector jet 200. The printing material 210 may be or include a metal, a polymer, or the like. For example, the printing material 210 may be or include aluminum or aluminum alloy, introduced via a printing material supply or spool of a printing material wire feed 208 (e.g., aluminum or other metal wire). Certain embodiments may not utilize a wire feed introduction of printing material, but may alternatively include a powder feed, liquid feed, or other method or manner of introducing a printing material into the liquid ejector jet 200.

The nozzle 202 of the liquid ejector jet 200 also defines a nozzle orifice 212. The printing material 210 retained within the nozzle 202 is jetted through the nozzle orifice 212 in the form of one or more liquid drops 214. These liquid printing material drops 214 may be jetted onto a substrate, such as a build plate, a previously jetted layer of drops or both, and can form one or more layers of solidified droplets 216 to eventually form a 3D object.

Referring to FIG. 3, an additive source 218 is in fluid communication with the nozzle 202, according to an embodiment of the present disclosure. For example, this additive source 218 is coupled to the nozzle 202 of the liquid ejector jet 200 by an additive inlet 220. The additive inlet 220 delivers a reactive gas 222 from the additive source 218 to the gas shield 204 where the reactive gas 222 combines with the first gas 206 and is then carried towards the nozzle 202 and nozzle orifice 212 to combine the reactive gas 222 with the printing material modified droplets 214 of the liquid printing material 210 in proximity to an external portion of the nozzle 202. This process results in the reactive gas 222 and printing material droplets 214 interacting via a chemical or physical mixing or reaction to create an in situ modified printing material. This in situ modified printing material has a different composition than the original liquid printing material 210.

In embodiments, the reactant gas 222 is mixed with the cover gas 206 and carried to an area in proximity around the nozzle orifice 212 of the nozzle 202. In an embodiment, only a portion of the 3D printed part has droplets or already formed layers of the printing material having an in situ modification of the molten or liquid printing material to form a fracture material. For example, a portion of the print material, such as at the interface 140 or an entire structural support 138, can be formed as a fracturable material.

In an embodiment, the fracturable material can be formed by exposing one or more of the printing materials either prior to, or after, deposition onto the substrate, or both. For example, exposure of the metal to the reactant gas can occur during deposition of the droplets or after deposition of the layers of metal, or both. The addition of an oxygen-containing gas as reactant gas 222 to oxidize forming or formed metal layers, such as, but not limited to layers comprising aluminum or aluminum alloys, would result in the formation of metal oxides (e.g., aluminum oxide) as fracturable materials. The addition of nitrogen, ammonia, or other nitrogen containing gases to nitride forming alloys such as, but not limited to, aluminum or aluminum alloys, would result in the formation of metal nitrides (e.g., aluminum nitride (AlN) or other potentially fracturable materials. Similarly, a combination of oxygen containing gases and nitrogen containing gases can be employed to form oxynitrides of metals, such as aluminum oxynitride.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of additive manufacturing, the method comprising:
   i) forming a first layer, the first layer comprising at least one material chosen from an article material, a support structure material and a fracturable material;
   ii) forming an additional layer on the first layer, the additional layer comprising at least one material chosen from the article material, the support structure material and the fracturable material; and
   iii) repeating ii) one or more times to form a three-dimensional build comprising an article and at least one support structure attached to the article at an interface, the interface comprising the fracturable material formed during one or more of i), ii) or iii), the fracturable material being formed by exposing a print material with a reactant gas; and wherein:
      the fracturable material is a native non-metal comprising an oxynitride of the article material; and
      the reactant gas comprises a nitrogen-containing gas.

2. The method of claim 1, wherein the article material is a metal.

3. The method of claim 2, wherein the reactant gas further comprises an oxygen-containing gas and the native non-metal further comprises an oxide of the metal.

4. The method of claim 1, wherein the support structure material and the article material are a metal and the fracturable material is a native non-metal.

5. The method of claim 1, wherein the article material is a metal and the fracturable material is a native non-metal, and further wherein the entire at least one support structure comprises the native non-metal.

6. The method of claim 1, wherein the print material is a liquid metal and forming both the first layer and the additional layer comprises jetting the liquid metal in an ambient atmosphere onto a print substrate, the ambient atmosphere comprising the reactant gas at greater than 10% by volume when forming the fracturable material, the ambient atmosphere comprising the reactant gas at less than 10% by volume when forming the article material.

7. The method of claim 1, further comprising cooling the article and at least one support structure without sintering the print material.

8. The method of claim 1, further comprising removing at least one support structure by fracturing the fracturable material at the interface, wherein the fracturing occurs without employing a mechanical cutting device.

9. The method of claim 8, wherein the fracturing is carried out using a technique chosen from vibrating the structural support and contacting the structural support with a pressurized fluid.

10. A method of additive manufacturing, the method comprising:
    i) jetting droplets comprising a metal to form a first layer, the first layer comprising at least one material chosen from an article material, a support structure material and a fracturable material;
    ii) jetting additional droplets comprising the metal to form an additional layer on the first layer, the additional layer comprising at least one material chosen from the article material, the support structure material and the fracturable material; and iii) repeating ii) one or more times to form a three-dimensional build comprising an article and at least one support structure attached to the article at an interface, the interface comprising the fracturable material formed during one or more of i), ii) or iii), the fracturable material being formed by exposing portions of metal in at least one form chosen from the droplets, the additional droplets, the first layer and the additional layer with a reactant gas; and wherein:

the fracturable material is a native non-metal comprising an oxynitride of the article material; and the reactant gas comprises a nitrogen-containing gas.

11. The method of claim 10, wherein the reactant gas further comprises an oxygen-containing gas and the fracturable material further comprises an oxide of the metal.

12. The method of claim 10, wherein the support structure material and the article material comprise the metal and the fracturable material is a native non-metal.

* * * * *